July 24, 1923.
D. HENDERSON
ICE TONGS
Filed Dec. 6, 1921
1,462,758
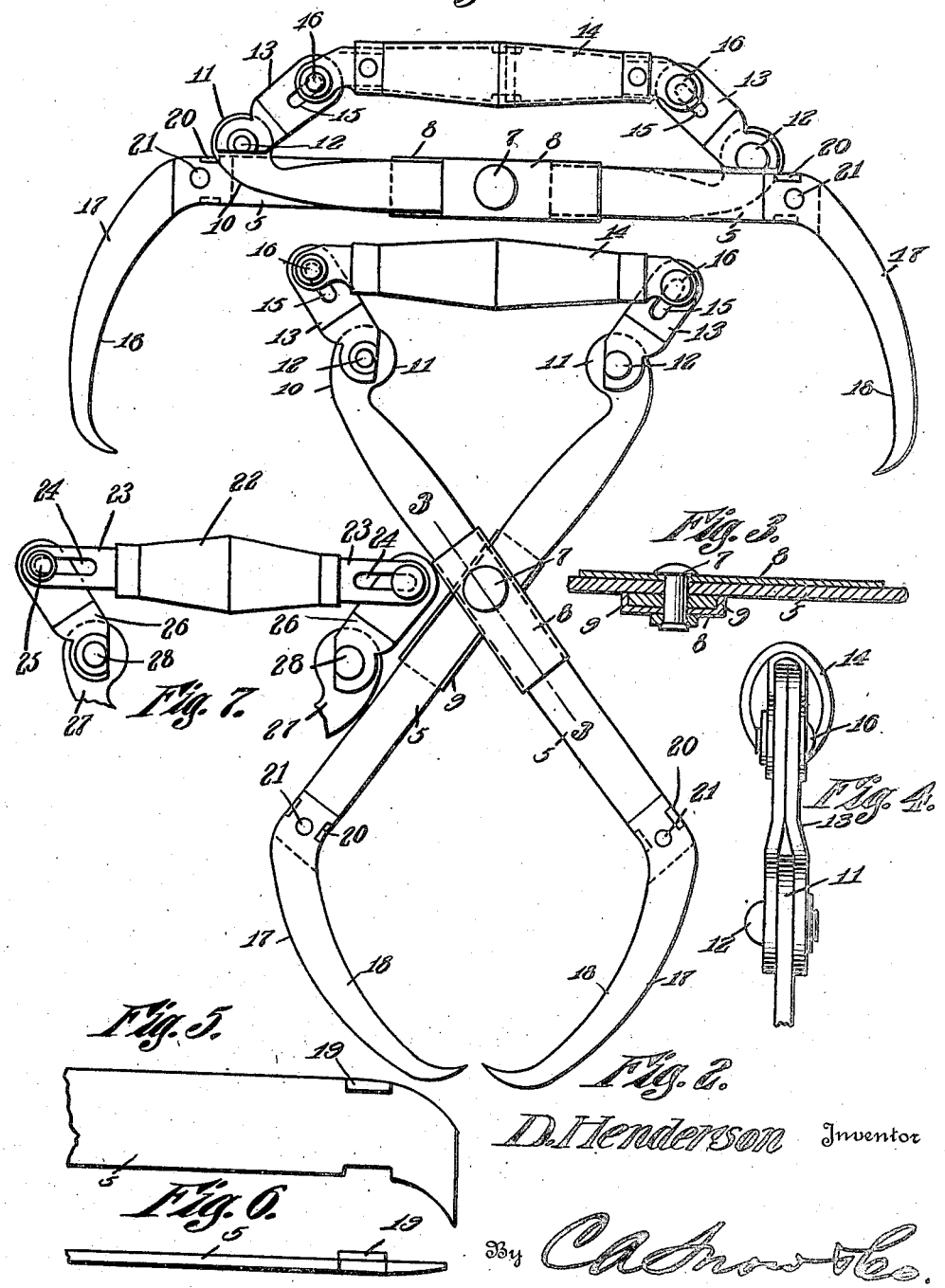
D. Henderson, Inventor Patented July 24, 1923.

1,462,758

UNITED STATES PATENT OFFICE.

DOUGLAS HENDERSON, OF DALLAS, TEXAS.

ICE TONGS.

Application filed December 6, 1921. Serial No. 520,331.

*To all whom it may concern:*

Be it known that I, DOUGLAS HENDERSON, a citizen of the United States, residing at Dallas, in the county of Dallas and State of Texas, have invented a new and useful Ice Tongs, of which the following is a specification.

This invention has reference to grapples and more particularly grapples used as ice tongs, the primary object of the invention being to provide a novel construction to facilitate the handling of ice or the like.

Another object of the invention is to provide means for connecting the handle to the arms of the tongs, whereby the handle may be moved to a position in spaced relation with the tongs, to permit the operator to position his hand on the handle, eliminating the necessity of moving the jaws of the tongs towards each other to grip the handle.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 is a side elevational view of ice tongs constructed in accordance with the present invention, and disclosing the same in their open positions.

Figure 2 is a side elevational view disclosing the tongues in a closed position.

Figure 3 is a sectional view taken on line 3—3 of Figure 2.

Figure 4 is a fragmental detail view disclosing the connection between the handle and tongs.

Figure 5 is an enlarged detail view of one end of one of the jaws, and

Figure 6 is an elevational view disclosing one edge of the jaw.

Figure 7 is a modified form of the handle.

Referring to the drawing in detail, the device includes a pair of arms indicated at 5, which are pivotally connected intermediate their ends as at 7. Each of these arms is provided with a bar 8, which has flanges 9 embracing the edges of the arms 5, to reinforce the arms at their pivot point. The upper ends of the arms 5 are curved slightly inwardly as at 10, and formed into heads 11, which heads are apertured to receive the bolts 12 that provide pivot points between the arms 5 and links 13 which connect the arms 5 and handle 14.

Each of these links 13 embodies spaced arms which grip opposed sides of the arm 5 associated therewith to restrict twisting movement of the handle 14 with respect to the arms 5. Formed in the links 13, adjacent to the outer ends thereof, are elongated openings 15, which openings accommodate the bolts 16 that extend through the handle 15, at points adjacent to the ends thereof. The links 13 have one of their ends cut away defining shoulders 13' which shoulders contact with the upper edge of the arm 5 associated therewith to restrict movement of the handle section with respect to the arms. Thus it will be seen that due to this connection, the handle may be moved to a position as illustrated by Figure 1 of the drawing, when the arms 5 have been moved to the limit of their expansion, thereby permitting the operator to readily grip the handle, the clearance between the handle and arms being designed to accommodate the fingers of the operator.

The jaws, which are indicated at 17, form an important part of the invention, and as shown, these jaws are formed with relatively straight portions 18 to permit the tongs to pass into an ice box or the like, without engaging the side walls thereof.

Each of these jaws is formed with flanges 19 that grip side walls of the arms 5, the arms 5 being also formed with flanges 20 to grip the side edges of the jaws. In order that the jaws will be held in position on the arms, rivets 21 are provided as clearly shown by Figure 2 of the drawing.

In the modified form of the invention as disclosed by Figure 7 of the drawing, the handle is indicated at 22, and is formed with extensions 23, each of which being provided with an elongated opening 24 to accommodate the pin 25 of the link 26 associated therewith. It might be further stated that these link members 26 have pivotal connection with the arms 27 of the tongs, as at 28.

Having thus described the invention, what is claimed as new is:—

Tongs including opposed arms pivotally connected intermediate their ends, a bar supported by each arm at a point adjacent to the pivot thereof, said bars having flanges engaging the side edges of the arms to distribute the strain directed to the arms throughout the lengths thereof, each of said arms having a head, the heads being disposed towards each other, link members having connection with the heads, a handle having pivotal connection with the link members, and jaws secured to the opposite ends of the arms.

In testimony that I claim the foregoing as my own, I have hereto affixed my signature in the presence of two witnesses.

DOUGLAS HENDERSON.

Witnesses:
T. F. FRAZIER,
G. P. WOOD.